United States Patent
Hauser et al.

(10) Patent No.: US 9,803,639 B2
(45) Date of Patent: Oct. 31, 2017

(54) SECTIONAL SEALING SYSTEM FOR ROTARY SCREW COMPRESSOR

(71) Applicant: GHH-Rand Schraubenkompressoren Gmbh, Oberhausen (DE)

(72) Inventors: Jan Hauser, Dortmund (DE); Michael Beinert, Dortmund (DE); Dieter Hutterman, Hunxe (DE)

( * ) Notice: Subject to any disclaimer, the term of this patent is extended or adjusted under 35 U.S.C. 154(b) by 283 days.

(21) Appl. No.: 14/577,624

(22) Filed: Dec. 19, 2014

(65) Prior Publication Data

US 2016/0177951 A1    Jun. 23, 2016

(51) Int. Cl.
| | |
|---|---|
| F03C 4/00 | (2006.01) |
| F04C 2/00 | (2006.01) |
| F04C 15/00 | (2006.01) |
| F04C 29/04 | (2006.01) |
| F04C 18/16 | (2006.01) |
| F04C 27/00 | (2006.01) |
| F16J 15/447 | (2006.01) |

(52) U.S. Cl.
CPC .......... *F04C 18/16* (2013.01); *F04C 15/0038* (2013.01); *F04C 27/009* (2013.01); *F16J 15/4472* (2013.01); *F04C 15/003* (2013.01); *F04C 2240/50* (2013.01); *F04C 2240/60* (2013.01); *F04C 2240/605* (2013.01)

(58) Field of Classification Search
CPC ...... F04C 18/16; F04C 27/009; F04C 15/003; F04C 15/0038; F04C 2240/50; F04C 2240/60; F04C 2240/605; F16J 15/00; F16J 15/447; F16J 15/4472

USPC ..... 418/102, 104, 140, 141, 201.1; 277/318, 277/320, 412, 432, 927
See application file for complete search history.

(56) References Cited

U.S. PATENT DOCUMENTS

| | | | |
|---|---|---|---|
| 1,871,661 A | | 8/1932 | Carrier |
| 3,302,951 A | | 2/1967 | Oleson |
| 3,503,618 A | | 3/1970 | Real |
| 3,975,123 A | * | 8/1976 | Schibbye .............. F04C 27/009 418/102 |
| 3,994,503 A | | 11/1976 | Dousse |
| 4,078,809 A | | 3/1978 | Garrick et al. |
| 4,257,617 A | | 3/1981 | Hill |
| 4,329,126 A | * | 5/1982 | Nishimura .............. F04C 18/16 418/201.1 |
| 4,781,553 A | | 11/1988 | Nomura et al. |
| 6,095,780 A | | 8/2000 | Ernens |

(Continued)

*Primary Examiner* — Theresa Trieu
(74) *Attorney, Agent, or Firm* — Taft Stettinius & Hollister LLP

(57) ABSTRACT

A sectional sealing system for water-spray type screw rotor compressor that is configured to prevent the intermixing of coolant and working fluid from a compression chamber with lubricant used to lubricate at least a bearing system of a rotor. The sealing system may include suction side and discharge side sealing portions that are positioned about first and second shafts, respectively, of the rotor. The suction side sealing portion may include a first seal, a first labyrinth seal, and a second labyrinth seal, the first seal being in proximity to a suction side of the compression chamber. The discharge side sealing portion may include a plurality of first seals, a second seal, a first labyrinth seal, and a second labyrinth seal, the plurality of first seals of the discharge side sealing portion being in proximity to a discharge side of the compression chamber.

20 Claims, 4 Drawing Sheets

(56) References Cited

U.S. PATENT DOCUMENTS

| | | | |
|---|---|---|---|
| 6,287,100 B1 * | 9/2001 | Achtelik | F04C 18/16 418/201.1 |
| 2008/0286129 A1 * | 11/2008 | Achtelik | F04C 18/16 418/201.1 |
| 2011/0135528 A1 | 6/2011 | Amano | |
| 2012/0230857 A1 | 9/2012 | Noguchi | |

* cited by examiner

SECTIONAL SEALING SYSTEM FOR ROTARY SCREW COMPRESSOR

BACKGROUND

Conventional rotary screw compressors often use intermeshing rotors to compress a working fluid. More specifically, a working fluid entering into a compression chamber of the compressor may be captured in a space between the rotors and housings. The captured working fluid may then be displaced along the rotors as the rotors are rotated. Further, the rotors are typically configured to reduce the volume of the space in which the captured working fluid is contained as the working fluid is displaced along the rotors, thereby compressing the working fluid. The compressed fluid may subsequently be released from the rotors and discharged from the compression chamber through a chamber outlet.

As described by physical gas laws, the temperature of a working fluid will typically increase as the working fluid is compressed. Further, the efficiency of the compression process typically decreases as the temperature of the working fluid increases. Thus, removing heat from the compression process, such as, for example, removing heat from the working fluid that is being compressed, may at least assist in improving compression efficiency. Cooling the working fluid that is undergoing compression may be achieved in a variety of different manners. For example, some rotary screw compressors, such as, for example, water-sprayer type compressors, circulate a coolant into the compression chamber that comes into contact with the working fluid. The coolant is utilized to absorb heat from the working fluid. A variety of different fluids may be used as the coolant, including, for example, water or water based coolant, among other fluids. Further, compressors are often configured to at least attempt to remove the coolant from the compressed working fluid prior to the working fluid being released from the compressor.

Rotary screw compressors often also use a lubricant, such as, for example, an oil, to provide lubrication for the components of the compressor, such as, for example, bearings and gearing. Yet, the integrity of the lubricant, as well as the lubricating characteristics of the lubricant, may be adversely impacted if the coolant and/or working fluid contaminates the lubricant. Similarly, the lubricant may be considered a contaminant if the lubricant were to enter into the working fluid and/or the coolant in the compression chamber.

BRIEF SUMMARY

An aspect of the present invention is a sectional sealing system that is positioned about a shaft of a screw compressor rotor and which is configured to prevent working fluid and coolant from leaking from a compression chamber and intermixing with lubricant from a bearing system. The sectional sealing system includes a first discharge side seal section having a plurality of seals that are configured to inhibit the flow of working fluid and coolant from a discharge side of the compression chamber. The sectional sealing system also includes a second discharge side seal section that is positioned downstream from the first discharge side seal section, the second discharge side seal section having a seal that is configured to inhibit the flow of working fluid and coolant that flowed past the first discharge side seal section. Additionally, the sectional sealing system includes a third discharge side seal section that is positioned downstream from the second discharge side seal section. The third discharge side seal section may include a labyrinth seal that is configured to inhibit the flow of working fluid and coolant that flowed past the second discharge side seal section. The sectional sealing system also includes a fourth discharge side seal section that is positioned downstream from the third discharge side seal section. The fourth discharge side seal section may include a labyrinth seal that is configured to inhibit the flow of a lubricant that was provided to lubricate the bearing system.

Another aspect of the present invention is a sectional sealing system that includes a first suction side seal section that has a seal that is configured to inhibit the flow of working fluid and coolant from a suction side of the compression chamber. The sectional sealing system also includes a second suction side seal section that is positioned upstream from the first suction side seal section. The second suction side seal section includes a labyrinth seal that, is configured to inhibit the flow of working fluid and coolant that flowed past the first suction side seal section. Additionally, the sectional sealing system includes a third suction side seal section that is positioned upstream from the second suction side seal section. The third suction side seal section may include at least one labyrinth seal that is configured to inhibit the flow of a lubricant that was provided to lubricate a bearing system.

Another aspect of the present invention is a sectional sealing system that is positioned about a first shaft and a second shaft of a rotor that is used to compress working fluid in a compression chamber. The sealing system includes a suction side sealing portion that is positioned about the first shaft. The suction side sealing portion includes a first suction side seal, a first suction side labyrinth seal, and a second suction side labyrinth seal, the first suction side seal being in proximity to a suction side of the compression chamber. Further, the first suction side seal and the second suction side labyrinth seal are configured to inhibit the upstream flow of coolant and working fluid along the first shaft. Additionally, the second labyrinth seal is configured to at least inhibit the downstream flow of lubricant along the first shaft. The sealing system also includes a discharge side sealing portion that is positioned about the second shaft. The discharge side sealing portion includes a first discharge side seal, a second discharge side seal, a first discharge side labyrinth seal, and a second discharge side labyrinth seal. The first discharge side seal is in proximity to a discharge side of the compression chamber. Further, the first and second discharge side seals and the first discharge side labyrinth seal are configured to inhibit the downstream flow of coolant and working fluid along the second shaft, while the second discharge side labyrinth seal is configured to inhibit the upstream flow of lubricant along the second shaft.

Figure 1:
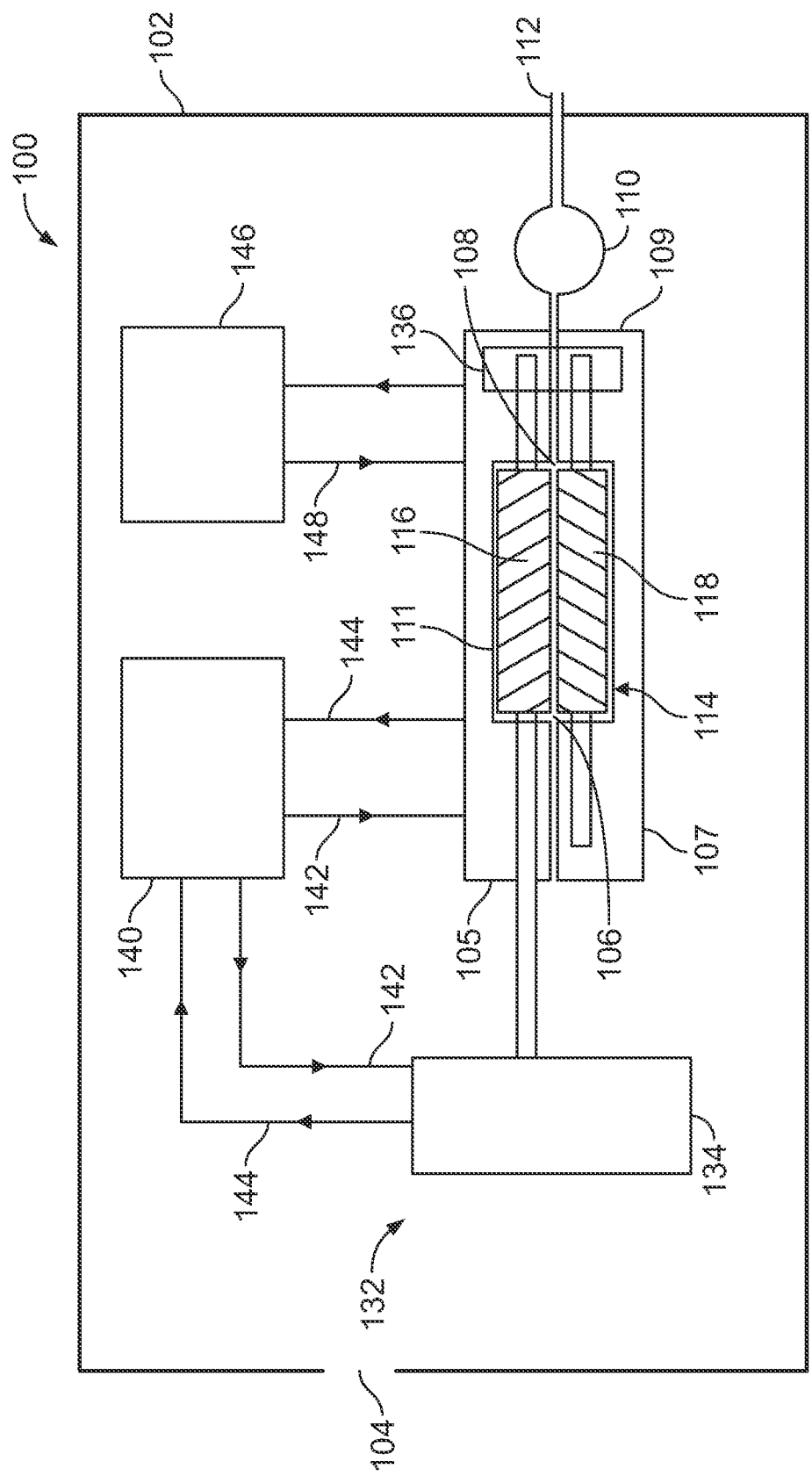
FIG. 1 illustrates a schematic of a rotary screw compressor system that is configured to compress, or pressurize, a working fluid, according to an embodiment of the present invention.

The foregoing summary, as well as the following detailed description of certain embodiments of the present invention, will be better understood when read in conjunction with the appended drawings. For the purpose of illustrating the invention there is shown in the drawings certain embodiments. It should be understood, however, that the present invention is not limited to the arrangements and instrumentalities shown in the attached drawings.

DESCRIPTION OF THE ILLUSTRATED EMBODIMENTS

FIG. 1 illustrates a schematic of a rotary screw compressor system 100 that is configured to compress, or pressurize, a working fluid, according to an embodiment of the present invention. A variety of different working fluids may be employed, including, for example, ambient air. As shown, according to certain embodiments, the working fluid may pass through an inlet 104 in a compressor unit 102 and into an inlet 106 of a compressor housing 107 before being directed into a compression side 105 of a compression chamber 111. The working fluid may then be compressed before flowing through a discharge side 109 of the compression chamber 111. The compressed working fluid may then pass through an outlet 108 of the compressor housing 107 before being processed within a separator 110. The separator 110 may be configured to withdraw a coolant, contaminates, or other items or materials from the compressed working fluid. The compressed working fluid may then be discharged from the compressor unit 102 via a compressed working fluid line 112 so that the compressed working fluid may be delivered to machinery and/or equipment that may utilize and/or store the compressed working fluid.

The compressor housing 107 may house a plurality of screw compressor rotors 114. Referencing FIG. 2, according to certain embodiments, the plurality of screw compressor rotors 114 may include a male screw rotor 116 and at least one female screw rotor 118. Further, according to certain embodiments, the male screw rotor 116 may include first and second shaft portions 120, 122 that extend from opposing sides of a helical screw portion 124 of the male screw rotor 116. Similarly, the female screw rotor 118 may also include first and second shaft portions 126, 128 that extend from opposing sides of a helical screw portion 130 of the female screw rotor 118. At least the helical screw portions 124, 130 of the male and female screw rotors 116, 118 may be positioned within the compression chamber 111.

While operably positioned within an enclosed compressor housing 107, the screw compressor rotors 116, 118 are rotatably displaced during the compression of the working fluid. More specifically, the helical screw portions 124, 130 of the screw compressor rotors 116, 118 are configured to capture working fluid between the helical screw portions 124, 130 and subsequently reduce the volume of the captured working fluid as the working fluid travels along the rotating helical screw portion(s) 124, 130, thereby compressing the working fluid.

Referencing FIG. 1, a drive system 132 may be employed to power the rotational displacement of the screw compressor rotors 116, 118. According to certain embodiments, the drive system 132 may include a power source 134 that provides rotational power. A variety of different power sources 134 may be employed, including, for example, an electric motor, an internal combustion engine, or a turbine, among other power sources. The power source 134 may be directly or indirectly coupled to one or more of the screw compressor rotors 116, 118, such as, for example, indirectly through a gear system. In the illustrated embodiment, rotational power from the power source 134 is indirectly transmitted to a shaft portion 120 of the male screw rotor 116 to rotatably displace the helical screw portions 124, 130 of the male and female screw rotors 116, 118. Further, according to certain embodiments, timing gears 136 may be used to ensure the screw compressor rotors 114 are in proper alignment. According to certain embodiments, at least a portion of the gear system may be housed in, or adjacent to, the compressor housing 107.

Referencing FIGS. 1-4, according to certain embodiments, the screw compressor rotors 116, 118 may be axially rotated about bearing systems 138. According to the illustrated embodiment, each bearing system 138 may include at least one of a radial bearing 138a, while one more of the bearing systems 138 may also include a thrust bearing 138b. Referencing FIGS. 2-4, bearing systems 138 may be positioned about the first and second shaft, portions 120, 122, 126, 128 of the male and female screw rotors 116, 118. Further, the bearing systems 138, as well as the gear system, may be provided with a lubricant, such as, for example, a petrochemical or synthetic based oil or grease, from a lubrication system 140, as shown in FIG. 5. According to certain embodiments, the lubrication system 140 may include a lubricant pump, reservoir, and/or a cooler, and is configured to circulate lubricant to the bearing systems 138 and gear system, such as, for example, via supply and return lines 142, 144.

According to the illustrated embodiment, the compression chamber 111 is configured to be relatively free of lubricant from the lubrication system 140. Further, the lubrication system 140 and chamber housing 107 may be configured to prevent working fluid from being exposed to the lubricant so that working fluid that exits the rotary screw compressor system 100 has no increase in lubricant content.

The temperature of the working fluid may typically increase as the screw compressor rotors 114 perform work on the working fluid, and more specifically, as the operation of the screw compressor rotors 114 compresses the working fluid. Thus, according to certain embodiments, the rotary screw compressor system 100 may be a water-sprayer type compressor that includes a coolant system 146 that is in fluid communication with the compression chamber 111. The coolant system 146 is configured to circulate a coolant through a conduit 148, such as, for example, water or a water based coolant, to the compression chamber 111 in at least an attempt to control the temperature of the working fluid as the working fluid is compressed. The quantity of coolant delivered into the compression chamber 111 may be sufficient to remove a portion of the heat emitted from the compression of the working fluid without flooding the compression chamber 111.

Figure 2:
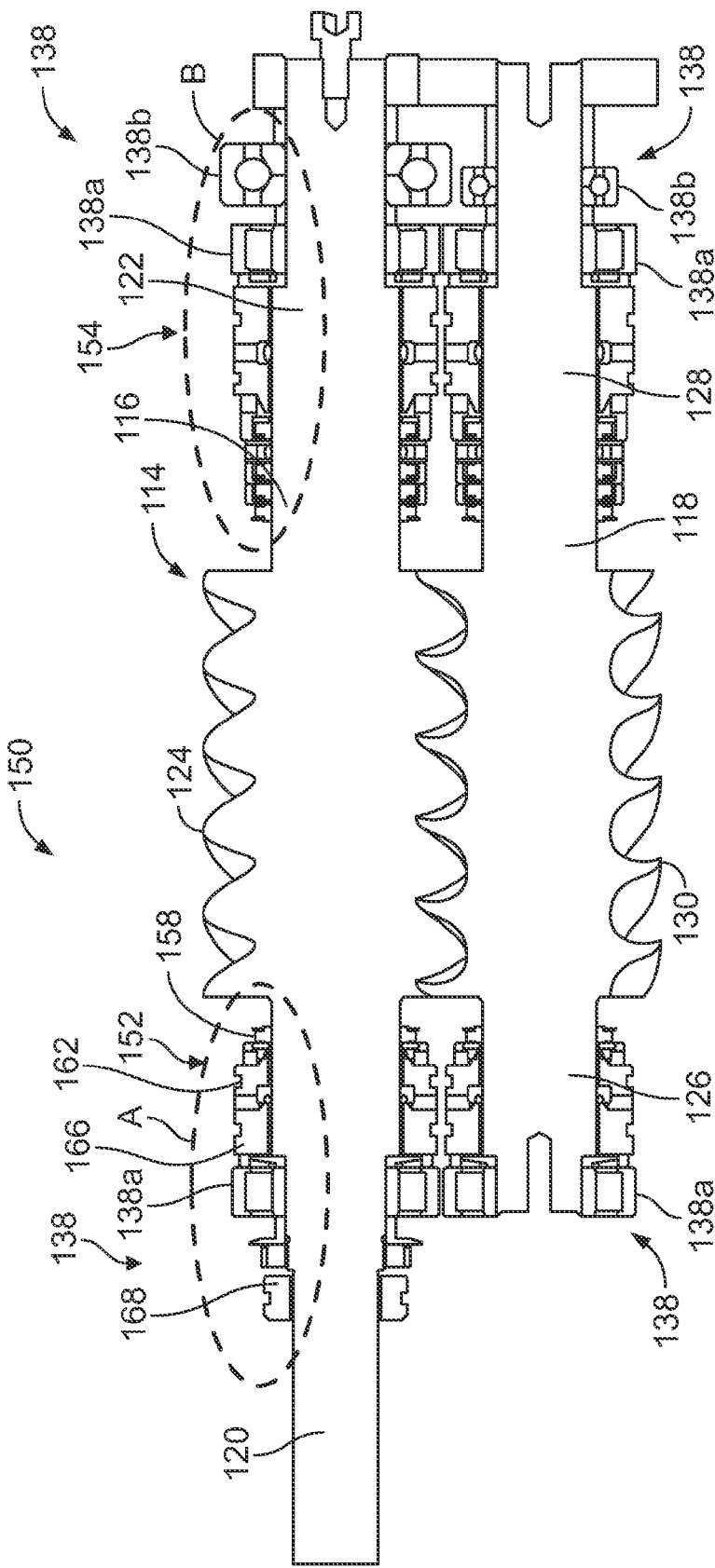
FIG. 2 illustrates a cross sectional view of male and female screw rotors having sectional sealing systems according to an embodiment of the present invention.
Figure 3:
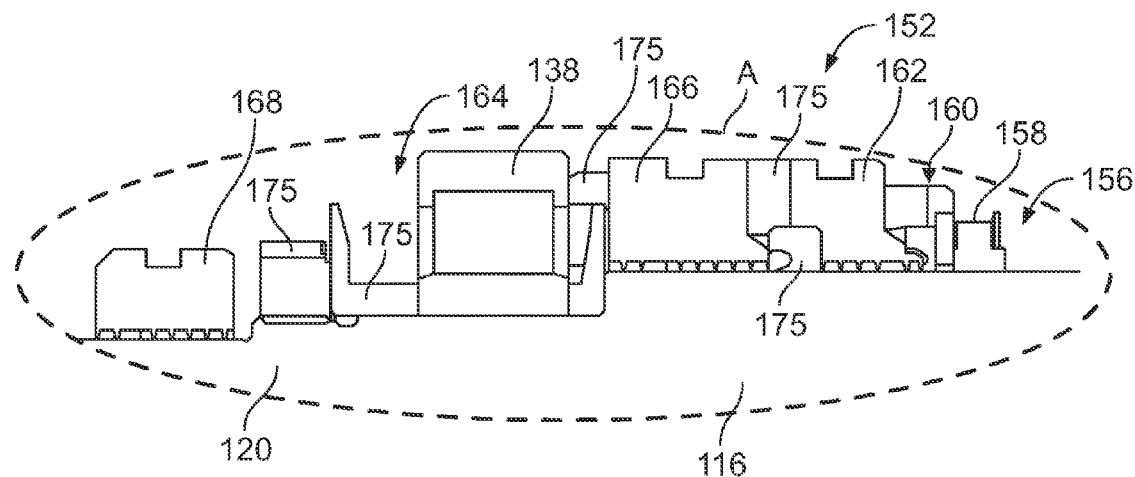
FIG. 3 illustrates an enlarged sectional view, as taken from area A in FIG. 2, of a suction side sealing portion of the sectional sealing system that is positioned about a portion of the male screw rotor according to an embodiment of the present invention.
Figure 4:
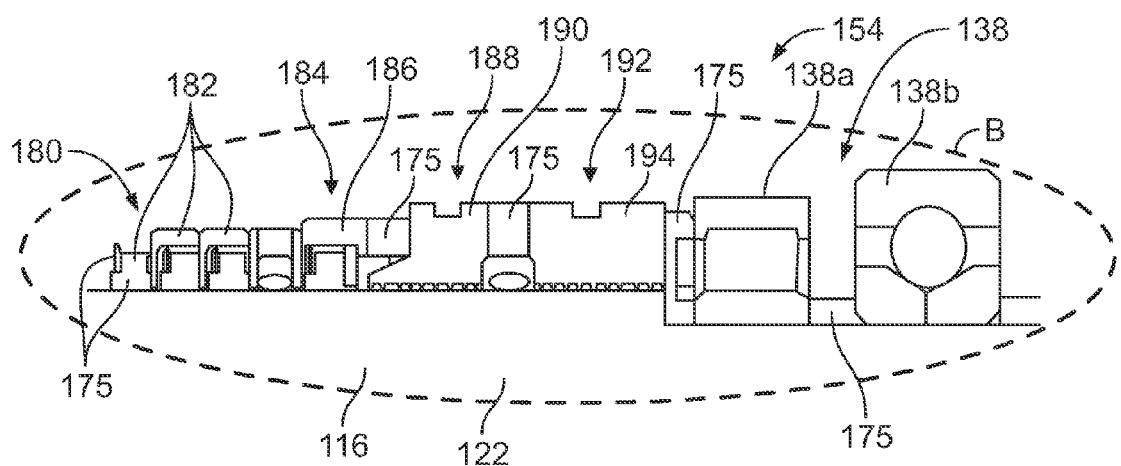
FIG. 4 illustrates an enlarged sectional view, as taken from area B in FIG. 2, of a discharge side sealing portion of the sectional sealing system that is positioned about a portion of the male screw rotor according to an embodiment of the present invention.
Figure 5:
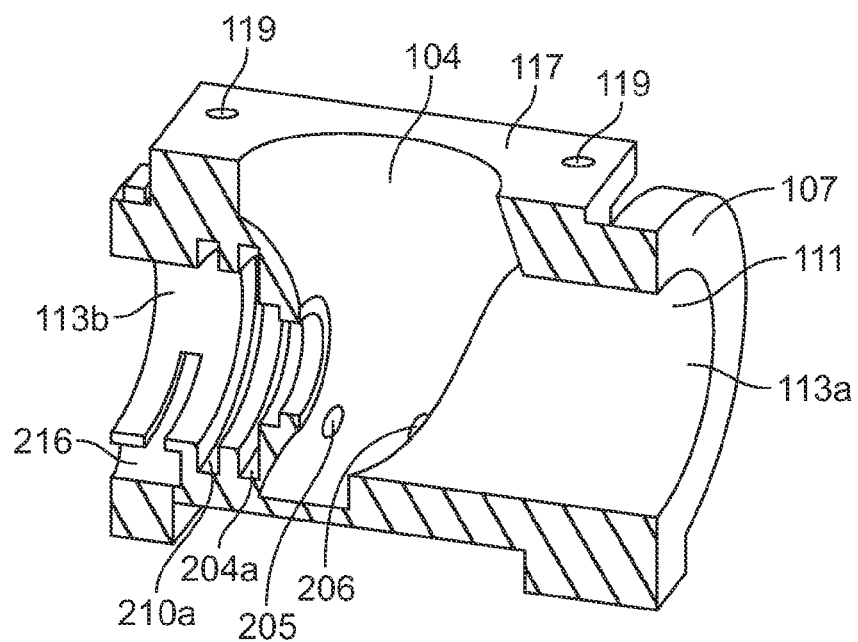
FIG. 5 illustrates a first cross sectional view of a portion of a compressor housing that is configured to operate with the suction side sealing portion of the sectional sealing system according to an embodiment of the present invention.

Referencing FIGS. 2-4, embodiments of the present invention include a sectional sealing system 150 that is configured to prevent coolant and/or working fluid from entering into the lubrication system 140, while also preventing lubricant from entering into the coolant system 146 and/or working fluid. For example, the sectional sealing system 150 is configured to separate the compression chamber 111 from both suction side and discharge-side bearing systems 138. According to the illustrated embodiment, the sectional sealing system 150 has a suction side sealing portion 152 and a discharge side sealing portion 154. The suction side sealing portion 152 may be positioned on or about the first shaft portion 120, 126 of the male screw rotor 116 and/or the female screw rotor 118 such that the suction side sealing portion 152 is at least generally proximate to a suction side 105 of the compression chamber 111. Conversely, the discharge side sealing portion 154 may be positioned on or about the second shaft portion 122, 128 of the male screw rotor 116 and/or the female screw rotor 118 such that the discharge side sealing portion 154 is at least generally proximate to a discharge side 109 of the compression chamber 111. While described below in reference to the male screw rotor 116, the sectional sealing system 150 is also applicable to configurations of the first and/or second shaft portions 126, 128 of the female screw rotor 518.

Referencing FIG. 3, according to the illustrated embodiment, the suction side sealing portion 152 may have three sections, namely first, second, and third suction side seal sections 156, 160, 164. Further, each of the suction side seal sections 156, 160, 164 may be adjacent to another one or more of the other suction side seal sections 156, 160, 164, and/or may be separated from a neighboring suction side seal section 156, 160, 164. For example, according to certain embodiments, one or more of the suction side seal sections 156, 160, 164 may be separated from a neighboring suction side seal section 156, 160, 164 by a gap, a housing wall, and/or one or more shaft components 175 that are positioned on and/or around the first shaft portion 120, such as, for example collars, retaining rings, springs, supports, and/or spacers, among other shaft components.

As shown by at least FIGS. 2 and 3, the first suction side seal section 156 may be positioned relatively adjacent to the helical screw portion 124 and configured to provide a barrier that inhibits working fluid and coolant from the compression chamber 111 from traveling along or about the first shaft portion 120 and toward the suction side of the compressor housing 107. Moreover, the first suction side seal section 156 may be configured to prevent coolant and/or working fluid from the compression chamber 111 from traveling along or about the first shaft portion 120 to a position(s) in which the working fluid and/or coolant may intermix with lubricant and/or contaminate the lubrication system 140. According to the illustrated embodiment, the first suction side seal section 156 may include a seal 158, such as, for example, a shaft seal, ring seal, or lip seal that may or may not be pressure actuated.

The second suction side seal section 160 is positioned upstream of the first suction side seal section 156 relative to the suction and discharge sides 105, 109 of the compression chamber 111. According to certain embodiments, the second suction side seal section 160 has a seal 162, such as, for example, a first labyrinth seal. In the illustrated embodiment, the second suction side seal section 160 is configured to prevent or restrict working fluid and/or coolant that passed through the first suction side seal section 156 from traveling further upstream, and thereby minimize the possibility of working fluid and/or coolant intermixing with lubricant and contaminating the lubrication system 140. For example, the seal 162 may be positioned and configured to inhibit upstream movement of working fluid and/or coolant so as minimize the opportunity for the working fluid and/or coolant to mix with lubricant that is lubricating an upstream positioned bearing system 138.

In the illustrated embodiment, the third suction side seal section 164 is positioned upstream of the second suction side seal section 156. The third suction side seal section 164 is configured to prevent the leakage of lubricant, such as, for example, lubricant that is providing at least lubrication for the operation of the bearing system 138 on the first shaft portion 120. As shown by at least FIG. 3, according to certain embodiments, the third suction side seal section 164 includes a first seal 166 that is positioned between the second suction side seal section 160 and the bearing system 138, and a second seal 168 that is position on a side of the bearing system 138 opposite of that of the first seal 166. The first and second seals 166, 168 are configured to inhibit lubricant from flowing along or about the first shaft portion 120 outside of the third suction side seal section 164. For example, at least the first seal 166 is configured to prevent lubricant from flowing downstream of the third suction side seal section 164 and toward the second suction side seal section 160, thereby minimizing the opportunity for the lubricant to contaminate the working fluid, coolant, and/or the coolant system 146. According to certain embodiments, the first and/or second seal 166, 168 may be second labyrinth seals.

Referencing FIGS. 2 and 4, according to the illustrated embodiment, the discharge side sealing portion 154 of the sectional sealing system 150 may have four sections, such as, for example, first, second, third, and fourth discharge side seal sections 180, 184, 188, 192. Further, each of the discharge side seal sections 180, 184, 188, 192 may be adjacent to another one or more other discharge side seal sections 180, 184, 188, 192, or may be separated from a neighboring discharge side seal section 180, 184, 188. For example, according to certain embodiments, one or more the discharge side seal sections 180, 184, 188, 192 may be separated from a neighboring discharge side seal section 180, 184, 188, 192 by a gap, a housing wall, and/or one or more shaft components 175 that are positioned on and/or around the second shaft portion 122, such as, for example collars, retaining rings, springs, supports, and/or spacers, among other components.

The first discharge side seal section 180 may include a plurality of seals 182, such as, for example, three rotary shaft or seal rings, that are configured to provide barriers that seek to prevent working fluid and coolant from leaking out of the compression chamber 111 (FIG. 1) along or about the first discharge side seal section 180. Moreover, the first discharge side seal section 180 may also provide a barrier that inhibits the flow of working fluid and/or coolant so as to prevent working fluid and/or coolant from reaching a position along the second shaft portion 122 or in the compressor housing 107 in which the working fluid and/or coolant may intermix with lubricant and/or contaminate the lubrication system 140.

The second discharge side seal section 184 is positioned downstream of the first discharge side seal section 180 and is configured to further inhibit the flow, and thus leakage, of working fluid and coolant. Moreover, the second suction side seal section 184 is configured to further inhibit working fluid and/or coolant that passed through the first discharge side seal section 180 from proceeding toward portions of and/or around the second shaft portion 122 that contain, or are exposed to, lubricant, thereby preventing coolant and working fluid from intermixing or contaminating lubricant and/or the lubrication system 140. According to the illustrated embodiment, the second discharge side seal section 184 includes a seal 186, such as, for example, a shaft seal, ring seal, or lip seal that may or may not be pressure actuated.

The third discharge side seal section 188 is configured to prevent the leakage of working fluid, coolant, and/or lubricant, such as, for example, lubricant that is providing lubrication for at least the operation of the bearing system 138 on the second shaft portion 122. According to certain embodiments, the third section includes a seal 190, such as, for example, a first labyrinth seal.

As shown by at least FIG. 4, the fourth discharge side seal section 192 includes a first seal 194, such as, for example, a second labyrinth seal, that is generally positioned between the third discharge side seal section 188 and the bearing system 138 of the second shaft portion 122. Additionally, according to certain embodiments, the fourth discharge side seal section 192 may include one or more seals on opposing sides of the bearing system 138 of the second shaft portion 122. The first seal 194 of the fourth discharge side seal section 192 is configured to inhibit lubricant from traveling to a position upstream of the fourth discharge side seal section 192, such as, for example, to the third discharge side seal section 188. Moreover, the first seal 194 is configured to inhibit lubricant from flowing past the fourth discharge side seal section 192 so as to minimize the opportunity for lubricant to intermix and contaminate the upstream working fluid and/or coolant, as well as contaminate the coolant system 146.

Figure 6:
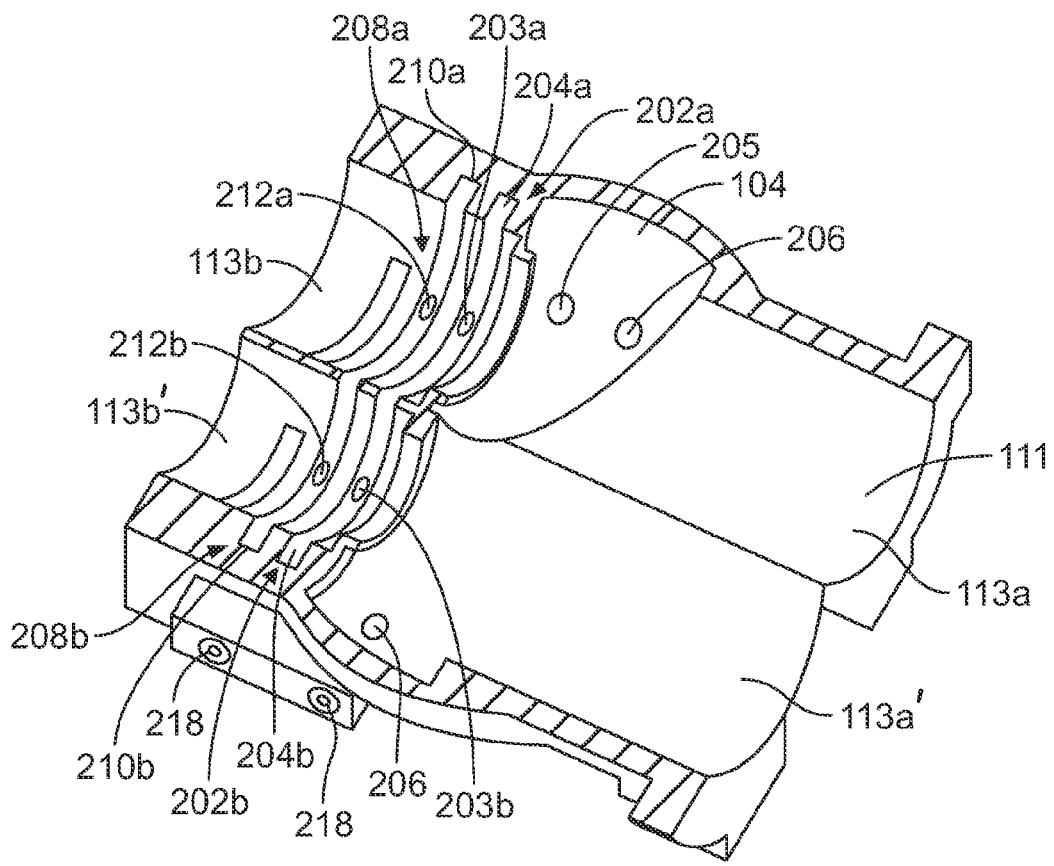
FIG. 6 illustrates a second cross sectional view of a portion of a compressor housing that is configured to operate with the suction side sealing portion of the sectional sealing system according to an embodiment of the present invention.

FIGS. 5 and 6 illustrate cross sectional views of portions of the compressor housing 107. As shown, a first interior surface 113a of the compressor housing 107 may generally define the compression chamber 111, while second interior surfaces 113b, 113b' may be generally configured to conform to the shapes and sizes of the first shaft portions 120, 126 of the male and female screw rotors 116, 118, respectively. As shown, the compressor housing 111 may include a flange 117 that includes one or more openings 119 that may be used in attaching the compressor housing 107 to an adjacent component or equipment, such as, for example, through the use of screws or fasteners that may extend through and/or threadingly engage the openings 119 of the flange 117.

The compressor housing 111 may include one or more fluid seal vents that are configured to collect working fluid and/or coolant that has leaked from the compression chamber 111. For example, according to the illustrated embodiment, the compressor housing 107 includes at least one fluid seal vent 202a, 202b positioned about the first shaft portions 120, 126 of the male and female screw rotors 116, 118. The fluid seal vents 202a, 202b each have an inlet orifice 203a, 203b that is disposed within a first radial groove 204a, 204b that extends about at least a portion of the respective second interior surface 113b, 113b'. Further, the inlet orifices 203a, 203b may be in fluid communication with an outlet orifice 205 that, according to the illustrated embodiment, is positioned along a portion of the inlet 104 of the compressor housing 107. According to certain embodiments, the first radial groove 204a, 204b is positioned between the first and second suction side seal sections 156, 160. However, the first radial groove 204a, 204b, as well as other radial grooves of similar seal vents, may be positioned in a variety of different locations, including, for example, upstream, downstream, and/or extending around one or more sections 156, 160, 164 of the suction side sealing portion 152 of the sectional sealing system 150.

In the illustrated embodiment, the first radial groove 204a, 204b is configured to recover coolant and/or working fluid from the compression chamber 111 that leaked past, or to, the first suction side seal section 156. Coolant and/or working fluid that reaches the first radial groove 204a, 204b may subsequently enter into the inlet orifice 203a, 203b and be delivered to the outlet orifice 205, such as, for example, via a passageway in, or connected to, the compressor housing 107. The coolant and/or fluid delivered to the outlet orifice 205 may then enter into the flow of working fluid that is flowing through the inlet 104 of the compressor housing 107, and subsequently flow back into the compression chamber 111.

Further, according to certain embodiments, the compressor housing 107 may also include at least one lubricant seal vent 208a, 208b that is configured to collect lubricant before or after the lubricant has leaked from a sealing section, such as, for example, the third suction side sealing section 164. For example, according to certain embodiments, second radial grooves 210a, 210b are positioned along the second interior surfaces 113b, 113b' around and/or downstream of the third suction side seal section 164. In the illustrated embodiment, the lubricant seal vents 208a, 208b include inlet orifices 212a, 212b that are disposed within the second radial grooves 210a, 210b. The inlet orifice 212a, 212b may be in fluid communication with a lubricant reservoir or lubricant containing passage, including for example, a lubricant drain 216. Further, according to certain embodiments, the inlet orifice 212 of the lubricant seal vent 208a, 208b may be in fluid communication with a reservoir that is operably connected to the compression housing 107, such as, for example by a threaded connection between a supply line and an opening 218 in the compression housing 107.

While the foregoing seal vents 202, 208 have been described in relation to the suction side sealing portion 152 of the sectional sealing system 150, similar seal vents may also be disposed within the compression housing 107 adjacent to the seals of the discharge side sealing portion 154 of the sectional sealing system 150. For example, a seal vent similar to the above-described fluid seal vent 202a, 202b may be positioned before or after one or more of the first and/or second discharge side seal sections 180, 184, and may return collected coolant and/or working fluid to the flow of incoming working fluid via one or more outlet ports 206 that may be positioned in, or in the vicinity of, the inlet 106 of the compression housing 107. According to certain embodiments, such orifices of seal vents along the discharge end of the compressor housing 107 may be in fluid communication with the associated outlet port 206 in a variety of different manners, including, for example, via passageways that are drilled or formed in the compression housing 107, or via supply lines that are operably connected to openings 218 of the compression housing 107, such as, for example, by a threaded connection.

Various features and advantages of the present invention are set forth in the following claims. Additionally, changes and modifications to the described embodiments described herein will be apparent to those skilled in the art, and such changes and modifications can be made without departing from the spirit and scope of the present invention and without diminishing its intended advantages. While the present invention has been illustrated and described in detail in the drawings and foregoing description, the same is to be considered illustrative and not restrictive in character, it being understood that only selected embodiments have been shown and described and that all changes, equivalents, and modifications that come within the scope of the inventions described herein or defined by the following claims are desired to be protected.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A sectional sealing system positioned about a shaft of a screw compressor rotor and configured to prevent working fluid and coolant from leaking from a compression chamber and intermixing with lubricant from a bearing system, the sectional sealing system comprising:
    a first discharge side seal section having a plurality of seals configured to inhibit the flow of working fluid and coolant from a discharge side of the compression chamber;
    a second discharge side seal section positioned downstream from the first discharge side seal section, the second discharge side seal section including a seal configured to inhibit the flow of working fluid and coolant that flowed past the first discharge side seal section;
    a third discharge side seal section positioned downstream from the second discharge side seal section, the third discharge side seal section including a labyrinth seal configured to inhibit the flow of working fluid and coolant that flowed past the second discharge side seal section; and
    a fourth discharge side seal section positioned downstream from the third discharge side seal section, the fourth discharge side seal section including a labyrinth seal configured to inhibit the flow of lubricant that was provided to lubricate the bearing system.

2. The sectional sealing system of claim 1, wherein the plurality of seals of the first discharge side seal section includes three shaft seals.

3. The sectional sealing system of claim 2, wherein the first discharge side seal section and the second discharge side seal section are separated from each other by one or more shaft components.

4. The sectional sealing system of claim 3, wherein the second discharge side seal section and the labyrinth seal of the third discharge side seal section are separated from each other by one or more shaft components.

5. The sectional sealing system of claim 4, wherein the labyrinth seal of the third discharge side seal section and the labyrinth seal of the fourth discharge side seal section are separated from each other by one or more shaft components.

6. The sectional sealing system of claim 5, further including a first suction side seal section, a second suction side seal section, and a third suction side seal section, the first suction side seal section having a seal configured to inhibit the flow of working fluid and coolant from a suction side of the compression chamber, the second suction side seal section positioned upstream of the first suction side seal section, the second suction side seal section including a labyrinth seal configured to inhibit the flow of working fluid and coolant that flowed past the first suction side seal section, the third suction side seal section positioned upstream from the second suction side seal section, the third suction side seal section including a labyrinth seal configured to inhibit the flow of lubricant that was provided for the lubrication of an adjacent upstream bearing system.

7. A sectional sealing system positioned about a shaft of a rotor that is used to compress a working fluid in a compression chamber of a water-spray type compressor, the sectional sealing system configured to prevent the leakage of working fluid and coolant from a compression chamber and to prevent leaked coolant and working fluid from intermixing with lubricant from a bearing system, the sectional sealing system comprising:
    a first suction side seal section having a seal configured to inhibit the flow of working fluid and coolant from a suction side of the compression chamber;
    a second suction side seal section positioned upstream from the first suction side seal section, the second suction side seal section including a labyrinth seal configured to inhibit the flow of working fluid and coolant that flowed past the first suction side seal section; and
    a third suction side seal section positioned upstream from the second suction side seal section, the third suction side seal section including at least one labyrinth seal configured to inhibit the flow of lubricant that was provided to lubricate the bearing system.

8. The sectional sealing system of claim 7, wherein the first suction side seal section and the labyrinth seal of the second suction side seal section are separated by one or more shaft components.

9. The sectional sealing system of claim 8, wherein the labyrinth seal of the second suction side seal section and the at least one labyrinth seal of the third suction side seal section are separated by one or more shaft components.

10. The sectional sealing system of claim 9, wherein the at least one labyrinth seal of the third suction side seal section includes a first labyrinth seal and a second labyrinth seal, the first and second labyrinth seals being positioned on opposing sides of the bearing system.

11. The sectional sealing system of claim 10, further including a first discharge side seal section, a second discharge side seal section, a third discharge side seal section, and a fourth discharge side seal section, the first discharge side seal section having a plurality of seals configured to inhibit the flow of working fluid and coolant from a discharge side of the compression chamber, the second discharge side seal section positioned downstream from the first discharge side seal section, the second discharge side seal section including a seal configured to inhibit the flow of working fluid and coolant that flowed past the first discharge side seal section, the third discharge side seal section positioned downstream from the second discharge side seal section and having a labyrinth seal configured to inhibit the flow of working fluid and coolant that flowed past the second discharge side seal section, the fourth discharge side seal section positioned downstream from the third discharge side seal section and having a labyrinth seal configured to inhibit the flow of a lubricant that was provided to lubricate an adjacent downstream bearing system.

12. A sectional sealing system positioned about a first shaft and a second shaft of a rotor that is used to compress working fluid in a compression chamber, the sectional sealing system comprising:

a suction side sealing portion positioned about the first shaft, the suction side sealing portion having a first suction side seal, a first suction side labyrinth seal, and a second suction side labyrinth seal, the first suction side seal being in proximity to a suction side of the compression chamber, the first suction side seal and the first suction side labyrinth seal configured to inhibit the upstream flow of coolant and working fluid along the first shaft, the second suction side labyrinth seal configured to at least inhibit the downstream flow of lubricant along the first shaft to prevent lubricant from flowing toward a second suction side seal; and a discharge side sealing portion positioned about the second shaft, the discharge side sealing portion having a first discharge side seal, a second discharge side seal, a first discharge side labyrinth seal, and a second discharge side labyrinth seal, the first discharge side seal being in proximity to a discharge side of the compression chamber, the first and second discharge side seals and the first discharge side labyrinth seal configured to inhibit the downstream flow of coolant and working fluid along the second shaft, the second discharge side labyrinth seal configured to inhibit the upstream flow of lubricant along the second shaft.

13. The sectional sealing system of claim 12, wherein the first discharge side seal comprises three ring seals.

14. The sectional sealing system of claim 13, wherein the second discharge side seal is positioned downstream of the first discharge side seal and upstream of the first discharge side labyrinth seal, and further wherein the second discharge side seal is separated from the first discharge side seal by at least one shaft component and the second discharge side seal is separated from the first discharge side labyrinth seal by at least one other shaft component.

15. The sectional sealing system of claim 14, wherein the first suction side seal is a ring seal.

16. The sectional sealing system of claim 12, wherein the first suction side labyrinth seal is positioned upstream of the first suction side seal and downstream of the second suction side labyrinth seal, and further wherein the first suction side labyrinth seal is separated from the first suction side seal by at least one shaft component and the first suction side labyrinth seal is separated from the second suction side labyrinth seal by at least one other shaft component.

17. The sectional sealing system of claim 12, wherein the second suction side labyrinth seal includes an upstream labyrinth seal positioned on a first side of a bearing system and a downstream labyrinth seal positioned on an opposing side of the bearing system.

18. The sectional sealing system of claim 17 further including a compressor housing having at least one suction side fluid seal vent, the at least one suction side fluid seal vent having a suction side inlet orifice, a suction side recess, and a suction side outlet orifice, the suction side inlet orifice being operably positioned within the suction side recess and in fluid communication with the suction side outlet orifice, the at least one suction side fluid seal vent configured to collect coolant from a flow of coolant that has been inhibited by at least one of the first suction side seal and the first suction side labyrinth seal, the collected coolant being delivered from the suction side inlet orifice to the suction side outlet orifice, the suction side outlet orifice configured to release the delivered coolant into a flow of working fluid in an inlet of the compressor housing.

19. The sectional sealing system of claim 18, wherein the compressor housing further includes at least one discharge side fluid seal vent, the at least one discharge side fluid seal vent having a discharge side inlet orifice, a discharge side recess, and a discharge side outlet orifice, the discharge side inlet orifice being operably positioned within the discharge side recess and in fluid communication with the discharge side outlet orifice, the at least one discharge side fluid seal vent configured to collect coolant from a flow of coolant that has been inhibited by at least one of the first discharge side seal and the second discharge side seal, the at least one discharge side fluid seal vent configured to deliver the collected coolant from the discharge side inlet orifice to the discharge side outlet orifice, the discharge side outlet orifice configured to release the delivered coolant into a flow of working fluid in the inlet of the compressor housing.

20. The sectional sealing system of claim 19 further including a compressor housing having a lubricant seal vent, the lubricant seal vent having an inlet orifice, a recess, and a lubricant drain, the inlet orifice being operably positioned within the recess and in fluid communication with the outlet orifice, the lubricant seal vent configured to collect lubricant from a flow of lubricant that has been inhibited by the second suction side labyrinth seal.

* * * * *